United States Patent
Nöcker

[11] Patent Number: 5,375,060
[45] Date of Patent: Dec. 20, 1994

[54] METHOD FOR CONTROLLING THE DISTANCE BETWEEN MOVING MOTOR VEHICLES

[75] Inventor: Gerhard Nöcker, Stuttgart, Germany

[73] Assignee: Daimler-Benz AG, Germany

[21] Appl. No.: 32,097

[22] Filed: Mar. 17, 1993

[30] Foreign Application Priority Data

Mar. 20, 1992 [DE] Germany .............................. 4209060

[51] Int. Cl.$^5$ .............................................. G06F 15/50
[52] U.S. Cl. .............................. 364/461; 364/426.04; 342/455; 340/903; 180/169; 180/170
[58] Field of Search .................. 364/426.04, 431.07, 364/460, 461; 180/176–179, 167–170; 123/352; 342/454, 455, 457; 340/903

[56] References Cited

U.S. PATENT DOCUMENTS

| | | | |
|---|---|---|---|
| 5,014,200 | 5/1991 | Chundrlik et al. | 364/426.04 |
| 5,165,497 | 11/1992 | Chi | 364/426.04 |
| 5,189,619 | 2/1993 | Adachi et al. | 364/426.04 |
| 5,278,764 | 1/1994 | Iizuka et al. | 364/460 |

FOREIGN PATENT DOCUMENTS

3822119  1/1990  Germany .

Primary Examiner—Gary Chin
Attorney, Agent, or Firm—Evenson, McKeown, Edwards & Lenahan

[57] ABSTRACT

A method for controlling the distance between moving vehicles can be used irrespective of the type of distance detection. The driver interventions which occur in the course of a currently-maintained distance control are detected and evaluated. For this, control devices, which are actuated in the course of the normal travel mode, for example the accelerator pedal, the brake pedal, the indicator lights, etc. are monitored. Conclusions are made as to the driver's current preferences from an evaluation of detected actuations and the driver's reaction time included in the currently calculated set distance is accordingly adaptively corrected. In this manner, dead times are minimized and the most rapid possible adaptation of the distance between vehicles to changing driving behavior of the driver is achieved. As a result, a significantly improved acceptance of a corresponding automatic distance control can be detected.

6 Claims, 1 Drawing Sheet

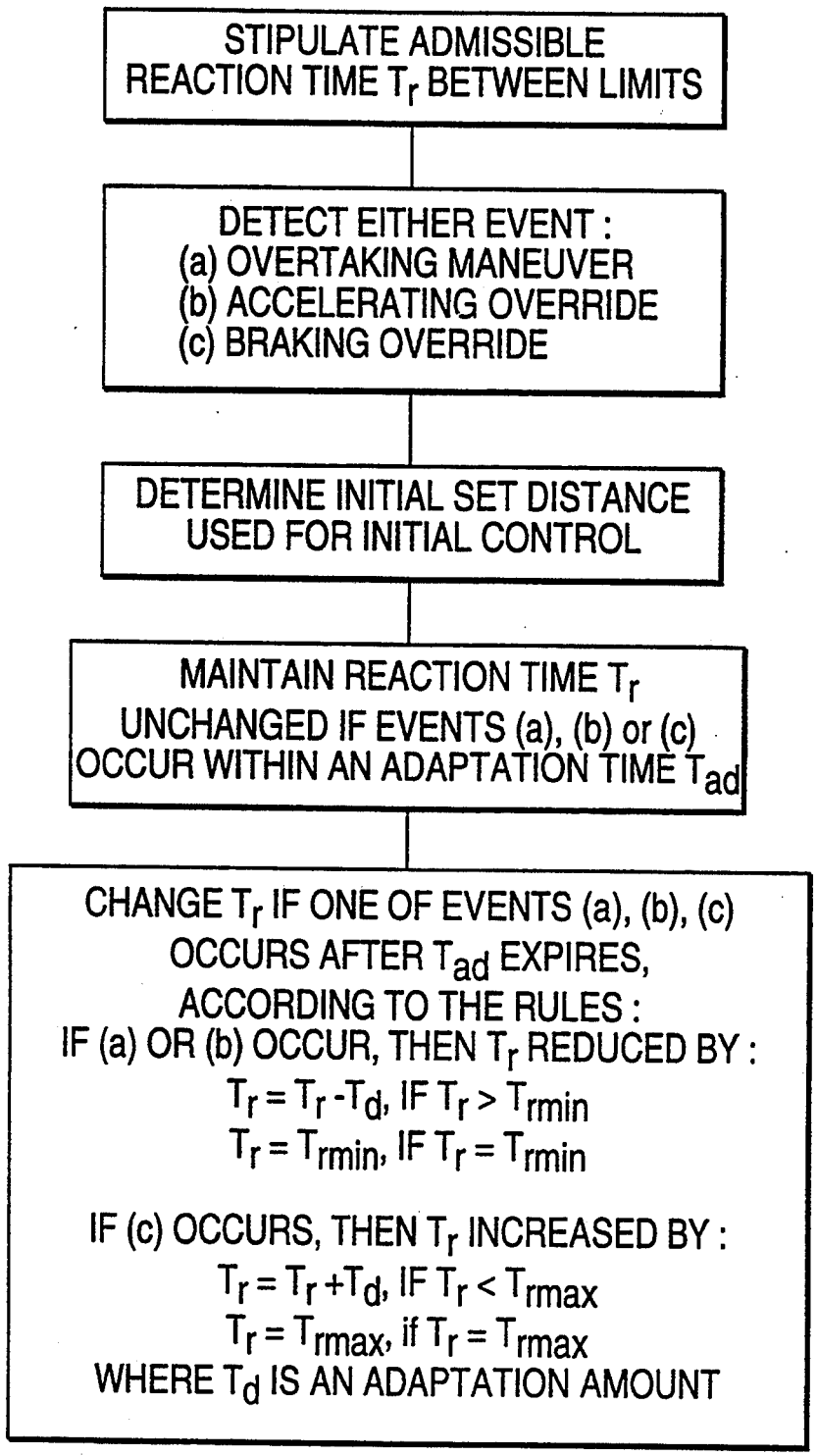

METHOD FOR CONTROLLING THE DISTANCE BETWEEN MOVING MOTOR VEHICLES

BACKGROUND AND SUMMARY OF THE INVENTION

The invention relates to a method for controlling the distance between moving motor vehicles. When automatically maintaining the distance between motor vehicles, a set distance is usually observed depending upon the speed. However, from experience it is known that this distance is actually only accepted by a small number of motorists. Therefore, unsteady states frequently occur which ultimately frustrate the implementation or maintenance of an optimum following distance of vehicles.

U.S. Pat. No. 5,014,200 discloses a system for the control of the travel speed of a vehicle, which system serves to observe a predetermined distance between the vehicle and a vehicle in front. In order to measure the distance and the relative speed between the two vehicles, a radar device is used in the following vehicle. Here, a critical distance between the vehicles is determined using the reaction time of the driver of the vehicle and is updated as a function of the vehicle's own speed. For this purpose, the driver of the vehicle enters his personal reaction time into the system. However, this intervention facility of the driver of the vehicle puts the effectiveness of such a system in doubt.

There is therefore needed a method for controlling the distance between moving motor vehicles, which method leads in practice to the distance between vehicles being automatically maintained in a way which finds a better degree of acceptance with drivers.

This need is met by a method of the generic type for controlling the distance between moving motor vehicles. The vehicle behind is equipped with an overridable automatic speed control and distance detection means and a current set distance which is to be specified to the distance controller being updated as a function of the vehicle's own detected current speed $V_e$ as $S_s = (V_e * T_r)$.

The method includes the steps of:

(1) stipulating a bandwidth for the admissible reaction time $T_r$ between a lower limit value $T_{rmin}$ and an upper limit value $T_{rmax}$;

(2) the following events are detected:
  (a) overtaking maneuvers by monitoring at least one of steering and indicator lights;
  (b) overrides of the automatic speed control by accelerating by monitoring the accelerator pedal;
  (c) overrides of the automatic speed control by braking by monitoring the brake pedal;

(3) determining the initial set distance $S_0$ which is to be specified to the distance controller on the basis of a permanently stored average reaction time $T_{rmit}$ and then used for initial control with $T_r = T_{rmit}$;

(4) The reaction time $T_r$ remains unchanged if an event (a), (b) or (c) occurs within a predetermined adaptation time $T_{ad}$, and is changed if an event (a), (b) or (c) occurs after the said adaptation time $T_{ad}$ expires in the event of (a) or (b), the current reaction time $T_r$ is reduced according to the following rule:

$T_r = T_r - T_d$, if $T_r$ is greater than $T_{rmin}$;

$T_r = T_{rmin}$, if $T_r$ is equal to $T_{rmin}$, where $T_d$ is the adaptation decrement, and in the event of (c) the current reaction time $T_r$ is increased according to the following rule:

$T_r = T_r + T_d$, if $T_r$ is smaller than $T_{rmax}$;

$T_r = T_{rmax}$, if $T_r$ is equal to $T_{rmax}$, where $T_d$ is the adaptation increment.

According to the present invention, the driver interventions which occur in the course of a currently maintained distance control are detected and evaluated. For this, control means which are actuated in the course of the normal travel mode, for example the accelerator pedal, the brake pedal, the indicator lights, etc. are monitored. Conclusions are made as to the driver's current wish or driving preferences from an evaluation of the driver's detected actuations and the driver's reaction time, included in the currently calculated set distance, is accordingly adaptively corrected.

In this manner, dead times are minimized and the most rapid possible adaptation of the distance between vehicles to changing driving behavior of the driver is achieved. As a result, a significantly improved acceptance for a corresponding automatic distance control can be detected.

Other objects, advantages and novel features of the present invention will become apparent from the following detailed description of the invention when considered in conjunction with the accompanying drawings.

BRIEF DESCRIPTION OF THE DRAWING

The sole FIGURE is a flow chart illustrating the operation of the present invention.

DETAILED DESCRIPTION OF THE INVENTION

According to the invention, an evaluating analysis of the driver's behavior is used to optimize the distance between vehicles which is to be set automatically.

For this purpose, the driver's current wish or preference is initially classified and detected with reference to the following features of the driver's behavior:

(a) A driver who often overtakes would like to drive more closely to the vehicle in front in order to be able to overtake more easily.

(b) A driver who often overrides the automatic speed control by accelerating would like to drive more closely to the vehicle in front in order to be able to overtake more easily.

(c) A driver who brakes often and early in the speed controlled mode would like to drive less closely to the vehicle in front.

In order to detect the features (a) to (c) of the driver's behavior, at least one, in general several, of the following actuation elements can be evaluated:

When maintaining distance: accelerator pedal with respect to travel/speed, and brake pedal with respect to travel/speed.

When there is on-going speed control, for example by means of a cruise speed control device:
  accelerator pedal with respect to travel/speed;
  brake pedal with respect to travel/speed;

in addition the following always are evaluated:
steering with respect to:
travel angle/speed;
indicator lights with respect to changing lane.

The control method of the present invention uses the following strategy. Since it generally takes a long time until the driver's behavior has been identified (1–5 minutes), every occurrence of features (a) to (c) of the driver's behavior which can be identified by means of corresponding actuations is used to reduce or to increase the reaction time used for calculation. This takes place in the manner of adaptive learning in increments and between two limit values for the reaction time.

The lower limit value (minimum reaction time) is derived from safety considerations whilst the upper limit value Maximum reaction time) is selected such that, in automatic mode, vehicles do not constantly cut in at the safety distance.

After adaptation has taken place, a fixed adaptation time $T_{ad}$ is to pass until a new actuation action of the driver leads to renewed adaptation of the reaction time which is to be applied computationally within the control of the distance between vehicles. In this manner, the adaptation speed is influenced. The distance control starts on the basis of a defined initial set value $S_0$, which corresponds to an average reaction time. Steps of the method control:

(1) A bandwidth for the admissible reaction time $T_r$ is stipulated between a lower limit value $T_{rmin}$ and an upper limit value $T_{rmax}$, wherein:

$$T_{rmin} \leq T_r \leq T_{rmax}$$

with the bandwidth limits
$T_{rmin}$—minimum reaction time
$T_{rmax}$—maximum reaction time;

(2) the following events are detected:
(a) overtaking maneuvers by monitoring at least one of steering and indicator lights;
(b) overrides of the automatic speed control by accelerating by monitoring the accelerator pedal;
(c) overrides of the automatic speed control by braking by monitoring the brake pedal;

(3) an initial set distance $S_0$ which is to be specified to the (3) distance controller is determined on the basis of permanently stored average reaction time $T_{rmit}$ and then used for initial control with $T_r = T_{rmit}$, wherein: ps
$T_{rmit} = \frac{1}{2}(T_{rmin} + T_{rmax})$ where
$T_{rmin}$—minimum reaction time
$T_{rmax}$—maximum reaction time;

(4) The reaction time $T_r$ remains unchanged if an event(a), (b) or (c) above, occurs within a predetermined adaptation time $T_{ad}$ and is changed if an event (a), (b) or (c) occurs after the adaptation time $T_{ad}$ expires, in the event of (a) or (b), the current reaction time $T_r$ is reduced according to the following rule:

$T_r = T_r - T_d$, if $T_r$ is greater than $T_{rmin}$;

$T_r = T_{rmin}$, if $T_r$ is equal to $T_{rmin}$, where $T_d$ is the adaptation decrement, and in the event of (c), the current reaction time $T_r$ is increased according to the following rule:

$T_r = T_r + T_d$, if $T_r$ is smaller than $T_{rmax}$;

$T_r = T_{rmax}$, if $T_r$ is equal to $T_{max}$ where $T_d$ is the adaptation increment;

(5) the current set distance $S_s$ which is to be specified to the distance controller is calculated and updated on the basis of the vehicle's own detected current speed $V_e$ as:

$S_s = (V_e * T_r)$.

The adaptation increment or decrement $T_d$ can be a fixed value in every case. If, for example, immediately after the start of distance control, a particularly rapid change in the reaction time $T_r$ is to be implemented, the adaptation increment/decrement $T_d$ can also be selected to decrease over time, in particular also decrease logarithmically. The adaptation time $T_{ad}$ can be a fixed value or it can be dynamically variable in order to permit a particularly flexible adaptation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for operating a distance controller of a rear vehicle for controlling distance between moving motor vehicles, wherein the rear vehicle is equipped with an overridable automatic speed control and distance detection means, a current set distance, $S_s$, that is specified to said distance controller being updated as a function of the rear vehicle's detected current speed $V_e$ such that $S_s = (V_e * T_r)$, wherein $T_r$ is a vehicle operator's admissable reaction time, the method comprising the steps of:

(1) stipulating a bandwidth for said admssible reaction time $T_r$ between a lower limit value $T_{rmin}$ and an upper limit value $T_{rmax}$;
(2) detecting the following driving events made by the vehicle operator:
(a) overtaking maneuvers by monitoring at least one of steering and indicator lights;
(b) overrides of the overridable automatic speed control by accelerating by monitoring an accelerator pedal;
(c) overrides of the overridable automatic speed control by braking by monitoring a brake pedal;
(3) determining an initial set distance $S_0$ specified to the distance controller on the basis of a permanently stored average reaction time $T_{rmit}$ and then using the initial set distance for initial control of the distance controller with $T_r = T_{rmit}$;
(4) maintaining the reaction time $T_r$ unchanged if one of said driving events (a), (b) and (c) above, occurs within a predetermined adaptation time $T_{ad}$ during which no changes in the reaction time $T_r$ take place, and changing the reaction time $T_r$ if one of said driving events (a), (b), and (c) occurs after said adaptation time $T_{ad}$ expires;

wherein, for said driving events (a) and (b), the reaction time $T_r$ is reduced according to the following rule:

$T_r = T_r - T_d$, if $T_r > T_{rmin}$, and $T_r = T_{rmin}$, if $T_r = T_{rmin}$, where $T_d$ is an adaptation amount; wherein for said driving event (c), the reaction time $T_r$ is increased according to the following rule:

$T_r = T_r + T_d$, if $T_r < T_{rmax}$, and $T_r = T_{rmax}$, if $T_r = T_{rmax}$;

and (5) operating said distance controller based on the reaction time $T_r$.

2. A method according to claim 1, wherein the adaptation amount $T_d$ is a fixed value.

3. A method according to claim 1, wherein the adaptation amount is a value which decreases in size from the start of operating said distance controller.

4. A method according to claim 1, wherein the adaptation amount is a value which decreases logarithmically from the start of operating said distance controller.

5. A method according to claim 1, wherein the adaptation time $T_{ad}$ is a fixed value.

6. A method according to claim 1, wherein the adaptation time $T_{ad}$ is dynamically variable.

* * * * *